United States Patent

McCauley et al.

[11] Patent Number: 5,600,104
[45] Date of Patent: Feb. 4, 1997

[54] LOAD CELL HAVING REDUCED SENSITIVITY TO NON-SYMMETRICAL BEAM LOADING

[75] Inventors: Jerry L. McCauley, Kent; William J. Moon, Seattle, both of Wash.

[73] Assignee: Structural Instrumentation, Inc., Tukwila, Wash.

[21] Appl. No.: 139,995

[22] Filed: Oct. 20, 1993

[51] Int. Cl.$^6$ ............... G01G 19/08; G01G 21/10; G01G 23/06
[52] U.S. Cl. ............... 177/136; 177/187; 177/DIG. 9; 384/596; 248/582
[58] Field of Search ............... 73/862.622, 862.631; 177/136, 187, 188, 261, DIG. 9; 384/594, 596, 610; 248/582, 619, 636, 562

[56] References Cited

U.S. PATENT DOCUMENTS

| | | | |
|---|---|---|---|
| 2,472,047 | 5/1949 | Ruge | 73/862.622 |
| 2,995,034 | 8/1961 | Boiten | 73/862.631 |
| 3,279,550 | 10/1966 | Kersten | 177/136 |
| 3,284,749 | 11/1966 | Fouretier | 73/862.622 |
| 4,020,911 | 5/1977 | English et al. | 177/136 |
| 4,560,017 | 12/1985 | Hood | 177/217 |
| 4,666,003 | 5/1987 | Reichow | 177/136 |
| 4,744,254 | 5/1988 | Barten | 73/862.622 |
| 4,921,059 | 5/1990 | Woodle IV et al. | 177/211 |
| 5,111,896 | 5/1992 | Porcari et al. | 177/187 X |
| 5,419,210 | 5/1995 | Haker | 73/862.631 |

OTHER PUBLICATIONS

Wood, U.K. Patent Application GB 2,220,758 A, Jan. 1990.

*Primary Examiner*—Michael L. Gellner
*Assistant Examiner*—Randy W. Gibson
*Attorney, Agent, or Firm*—Seed and Berry LLP

[57] ABSTRACT

A load cell having a measurement beam and a pivotal support for either coupling a load to the beam or supporting opposite ends of the beam. In one embodiment, opposite ends of a beam are secured to the upper surface of a frame, and the load is applied to the upper surface of the beam at its mid-point through a load applying member and a sphere positioned between the load applying member and the beam. Bolts positioned symmetrically about the sphere pass loosely through the load applying member and are threaded into the beam. The bolts maintain the sphere in contact with the load applying member and beam while allowing relative angular movement between the beam and the load applying member. In another embodiment of load cell, opposite ends of a beam are supported on a frame through respective, generally spherical members, and the load is applied to the center of the beam.

9 Claims, 3 Drawing Sheets

LOAD CELL HAVING REDUCED SENSITIVITY TO NON-SYMMETRICAL BEAM LOADING

TECHNICAL FIELD

This invention relates load cells, and, more particularly, to a load cell using an improved method and apparatus for coupling loads to a measuring beam used in the load cell.

BACKGROUND OF THE INVENTION

Load cells have long been used to measure the weight of loads. Many load cells utilize a measurement beam which carries all or a part of the load to be measured and thus deforms as a function of the weight of the load. Load cell measurement beams are typically either of two types, namely bending beams and shear beams. Bending beams undergo bending strains as a function of the weight of the load applied to the beams, while shear beams undergo shear strains as a function of the weight of the load applied to the beams. Strain measuring devices, such as strain gauges, are normally mounted on the beams to measure the magnitude of the load induced bending strains in bending beams or the load induced shear strains or shear beams.

The accuracy of load cells employing bending beams and shear beams is highly dependent on the manner in which the beams are supported and/or how the loads are coupled to the beams. Ideally, changes in the load induced deformation of the beam, i.e., the bending strain or shear strain, should be solely a function of changes in the weight of the load. If the structure that either supports the beam or couples the load to the beam applies rotational moments or twisting torques to the beam, then the deformation of the beam will not be a true indication of the weight of the load.

Not only should the beam be supported and/or loaded in a manner that does not apply rotational moments or twisting torques to the beam, but the beam supporting or loading structure should not restrain the beam from the load induced deformations that are to be measured. For example, for a beam that is freely supported at each end, i.e., a non-cantilever beam, the support structure should allow the ends of the beam to freely pivot.

The location at which the beam is supported and/or the location where the load is applied to be beam can also affect the accuracy of load cells using measurement beams. In particular, it is important that the beam be symmetrically supported and loaded so that the weight induced deformation of the beam is symmetrical.

While the above-described problems can exist in any load cell employing measurement beams, they are perhaps most serious for load cells used in on-board weighing applications. In on-board applications, forces are exerted on the load in all directions resulting from turning, braking, bumps, etc.. These diverse forces can be relatively large; in fact, they can sometimes exceed the weight of the load itself during a sudden stop, a sharp turn, or a hard bump. As a result, there can be large variations in both the direction and the location that the load is applied to prior art beams used for on-board applications, thus inducing severe rotational moments and twisting torques in the beams.

In the past, attempts have been made to ensure the proper direction and location of beam loading by either using complex and costly mechanical coupling mechanisms or by attempting to electrically compensate for the inaccuracies. For example, unequal loading can be electrically compensated to some extent by mounting strain gauges on the beam in a manner that allows them to sense rotational moments. Signals generated by these strain gauges can then be used to adjust the signals generated by the load sensing strain gauges. However, all of these prior art approaches, whether electrical or mechanical, are only partially effective in compensating for inaccuracies, and they can substantially add to the cost, complexity and size of load cells.

Attempts have also been made to limit the number or types of forces and/or torques that can be applied to measurement beams by supporting or loading the beans through linear pivots or "knife edges." However, linear supports or coupling members are nevertheless capable of coupling rotational moments and twisting forces to measurement beams. Thus, these prior art techniques do not adequately cause the measurement beam to respond only to the weight of the load.

SUMMARY OF THE INVENTION

The primary object of the invention to provide a load cell that can achieve a high level of accuracy without the use of costly, complex and/or bulky mechanical or electrical compensating mechanisms.

It is another object of the invention to provide a relatively simple and inexpensive mechanism for symmetrically applying a load to a measurement beam used in a load cell.

It is still another object of the invention to provide a mechanism for symmetrically loading beams having a wide variety of deformation characteristics.

These and other objects of the invention are provided by a load cell having a measurement beam coupled to at least one pivot point support for either supporting the beam or applying a load to beam. The load to be measured is then coupled through the pivot point support so that the beam deflects as a function of the weight of the load. The beam may be either a bending beam or a shear beam. A transducer attached to the beam measures load induced strains in the beam to provide an indication of the weight of the load. The pivotal, single point nature of the support prevents rotational moments from being applied to the beam though the support. In one embodiment, opposite ends of the beam are fixedly secured to a frame, and the load is applied to the beam through the pivot point support at the center of the beam. In another embodiment, the load is applied to the center of the beam, and the ends of the beam are supported on a frame through respective pivot point supports. As a result, the beam is free to pivot from side-to-side about the longitudinal axis of the beam.

The beam and a structural member attached to the pivot point support are preferably interconnected to restrain relative movement between the beam and the structural member toward and away frown each other while allowing relative angular movement between the beam and the structural member.

DETAILED DESCRIPTION OF THE INVENTION

Figure 1:
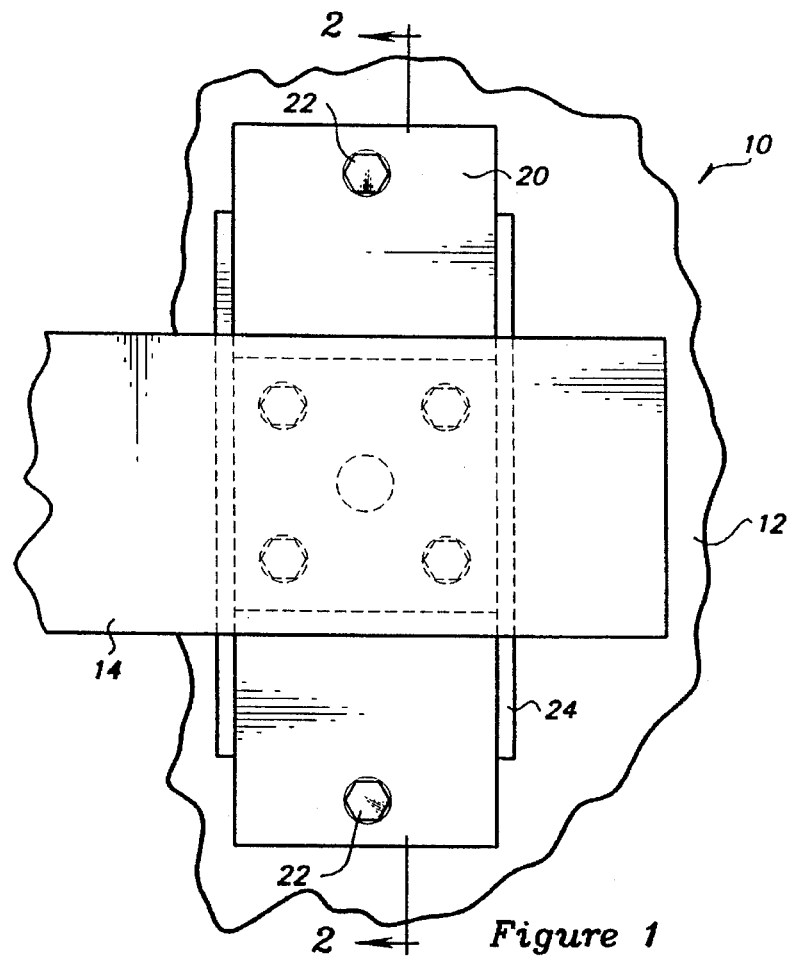
FIG. 1 is a top plan view of one embodiment of the inventive load cell.
Figure 2:
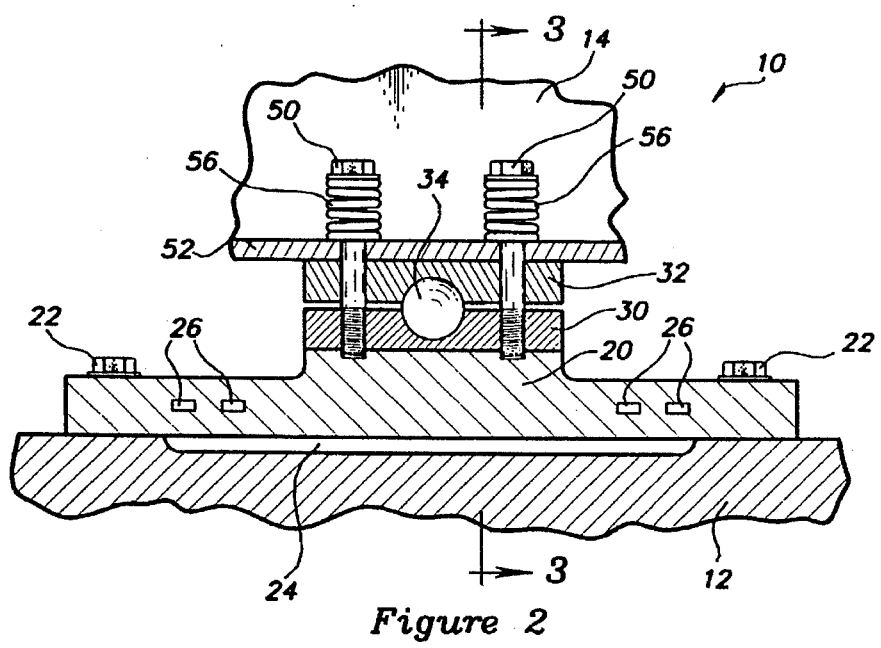
FIG. 2 is a cross-sectional view taken along the line 2—2 of FIG. 1.
Figure 3:
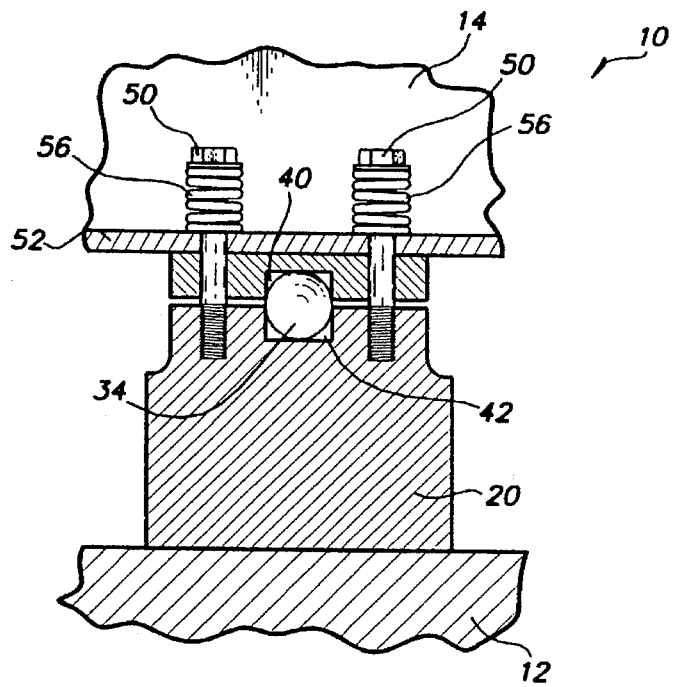
FIG. 3 is a cross-sectional view taken along the line 3—3 of FIG. 2.

One embodiment of the inventive load cell is illustrated in FIGS. 1–3. The inventive load cell 10 is illustrated as part of an on-board weighing system for a logging truck having a vehicle frame 12 and a cross member 14 that normally extends transversely to a portion of the frame on the opposite side of the truck. The cross member 14 supports a log bunk (not shown) which in turn, supports the logs carried by the truck. A similar bunk and cross member (not shown) is normally carried by the frame 12 forwardly or rearwardly of the cross member 14 illustrated in FIGS. 1–3. Thus, the logs are normally supported at two longitudinally spaced locations. Although the inventive load cell can be advantageously used to measure the weight of logs carried by such logging trucks, it will be understood that the inventive load cell may be used in other on-board weighing applications or in applications in which it is not part of on on-board weighing system.

With further reference to FIGS. 1–3, the inventive load cell includes a beam 20 that is secured at opposite ends to the frame 12 by respective bolts 22. As best illustrated in FIG. 2, the portion 24 of the frame 12 beneath the beam 20 is relieved downwardly to allow the beam 20 to deflect downwardly. As also best illustrated in FIG. 2, the beam 20 is instrumented with conventional strain gauges 26 which measure the magnitude of the load induced deformation of the beam 20. The strain gauges 26 may be adapted to measure either the bending strains in the beam 20 or the shear strains in the beam 20 by appropriate placement of the strain gauges 26.

With further reference to FIGS. 1–3, the center section of the beam 20 projects upwardly to form a load applying region 30. A similarly shaped load applying member 32 is either integrally formed or secured to the underside of the cross member 14 adjacent the load applying region 30. The upper surface of the load applying region 30 and the lower surface of the load applying member 32 are spaced apart from each other by a sphere 34 so that the load applying member 32 can freely pivot with respect to the load receiving region 30. As a result, while the load applying member 32 can apply forces to the beam 20, it is utterly incapable of imparting rotational moments or twisting forces to the beam 20. The load induced deformation of the beam 20 it thus a true measures of the magnitude of the applied load.

As best illustrated in FIGS. 2 and 3, the sphere 34 is positioned almost entirely in a pair of recesses 40, 42 formed in the load applying member 32 and the load receiving region 30, respectively. The recesses 40, 42 capture the sphere 34 and prevent transverse movement of the cross member 14 relative to the beam 20. Although a sphere 34 is shown in FIGS. 1–3 for applying the load to the beam 20 single pivot point, it will be understood that other structures may be used for that purpose.

Although not necessary in many applications, it is generally desirable in on-board weighing applications for the load applying structures, i.e., the cross member 14 and the load applying member 32, to be restrained against movement toward and away from the beam 20. This restraint ensures that the load receiving region 30 and the load applying member 32 both remain in contact with the pivot point formed by the sphere 34.

The embodiment illustrated in FIGS. 1–3 uses four bolts 50 to restrain the cross member 14 and the load applying member 32 against movement toward and away from the beam 20. The bolts 50 pass through a flange 52 in the cross member 14 and through a bore formed in the load applying member 32 where they are threaded into the beam 20. The diameter of the bore formed in the flange 52 and load applying member 32 is larger than the diameter of the bolt 50 so that the flange 52 and load applying member 32 fit loosely on the bolt 50. As a result, relative angular movement between the cross member 14 and the beam 20 can occur with relative ease while the bolt 50 restrains the cross member 14 from moving upwardly away from the beam 20. A spring 56 is preferably compressed between the head of each bolt 50 and the flange 52 to resiliently bias the load applying member 32 against the sphere 34. If the spring is not used, upward movement of the cross member 14 may impart excessive shocks to the head of the bolt 50 when the flange 52 strikes the head of the bolt 50.

Figure 4:
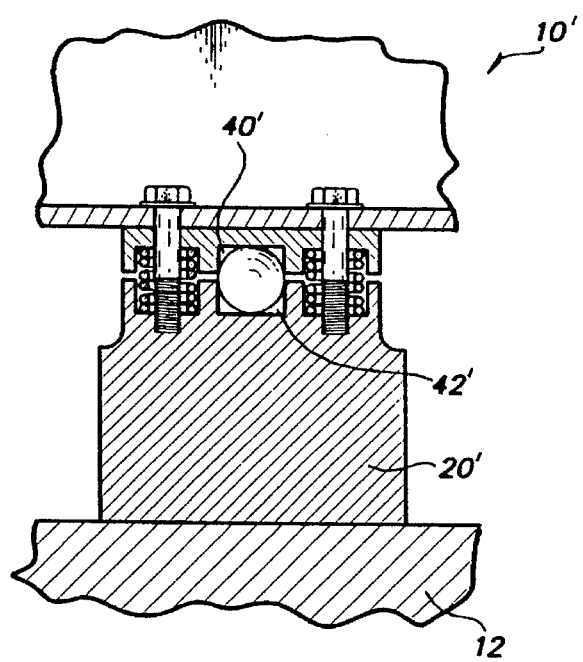
FIG. 4 is a cross-sectional view similar to FIG. 3 showing an alternative retaining mechanism.

Although the embodiment of FIGS. 1–3 uses bolts to hold the load applying region 30 and the load applying member 32 against the sphere 34, other restraining means or, as mentioned above, no restraining means at all, may be used. Also, springs 56' may be located in other positions, such as illustrated in FIG. 4. As illustrated in FIG. 4, the springs 56' force the flange 52 against the head of the bolt 50.

As explained above, the load applying structure illustrated in FIGS. 1–3 is highly advantageous in allowing the load cell 10 to accurately measure the weight of applied loads. Moreover, the load applying structure is relatively simple and inexpensive, and it does not appreciably add to the size of the resulting load cell.

Figure 6:
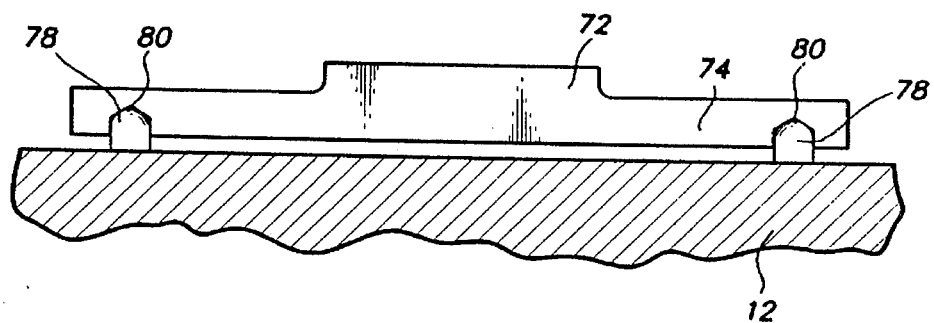
FIG. 6 is a cross-sectional view taken along the line 6—6 of FIG. 4.
Figure 5:
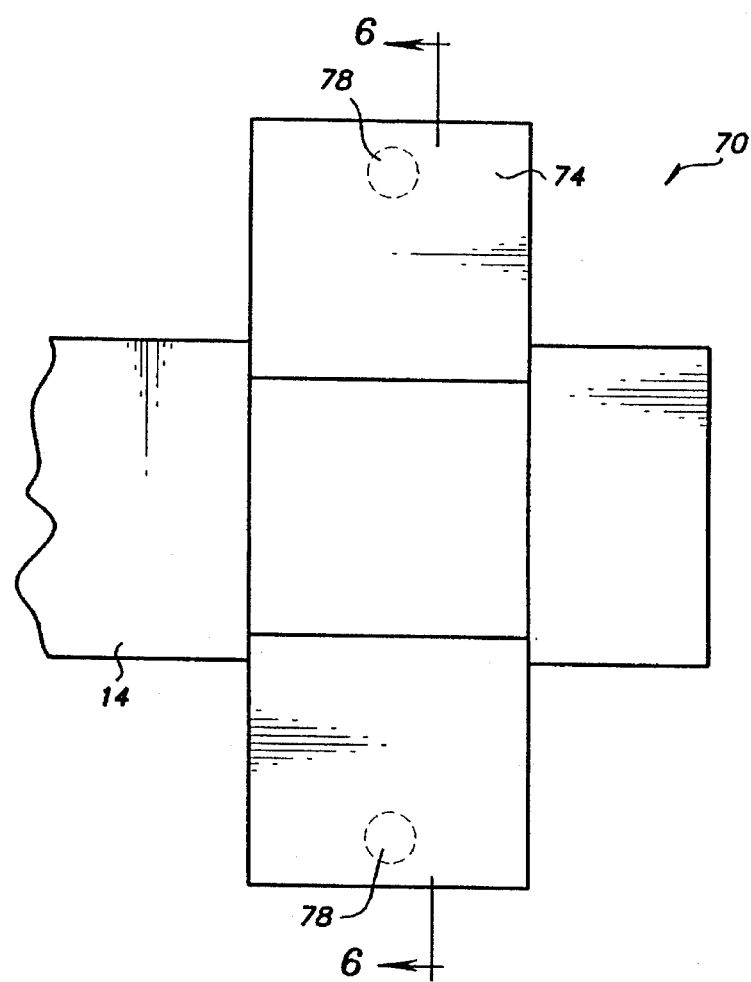
FIG. 5 is top plan view of another embodiment of the inventive load cell.

An alternative embodiment of the inventive load cell is illustrated in FIGS. 5 and 6. The load cell 70 of FIGS. 5 and 6, like the load cell 10 of FIGS. 1–3, is shown as part of an on-board weighing system for log trucks. However, as with the embodiment of FIGS. 1–3, the load cell 70 of FIGS. 5 and 6 need not be part of an on-board weighing system.

With reference to FIGS. 5 and 6, the cross member 14 is secured to a load receiving region 72 of a beam 74 such as by welding. Opposite ends of the beam 74 are supported by respective, generally spherical members 78. As best illustrated in FIG. 6, the generally spherical member 78 has a flat lower surface which rests on the vehicle frame 12 and a generally spherical upper surface which is contained within respective recesses 80. The recesses 80 allow the beam 74 to freely pivot about the longitudinal axis of the beam 74 while preventing transverse movement of the beam 74 relative to the frame 12. Although the cross member 14 may apply rotational moments to the beam 74, these rotational moments cannot cause the beam to deform since the beam will freely pivot on the generally cylindrical members 78. Thus, by either supporting the beam through a pair of spaced apart pivot points or by applying a load to the beam through a single pivot point, the beam is able to accurately measure the weight of the load.

We claim:

1. A load cell for use in an on board weighing system for measuring the weight of a load, said load cell comprising:

a vehicle frame;

a load carrying member supporting said load;

a beam positioned between said vehicle frame and said load carrying member;

a pivot point support positioned between said beam and a support member, said support member being one of said load carrying member and said vehicle frame so that said load is carried by said vehicle frame through said load carrying member, said beam and said pivotal support, said pivot point support preventing said beam from receiving rotational moments about at least one axis;

transducer means for measuring load induced strains in said beam indicative of the weight of said load; and at least one fastener interconnecting said beam and said support member, said fastener restraining relative movement between said beam and said support member toward and away from each other while allowing relative angular movement between said beam and said support member, said fastener including a bolt extending through a bore formed into said support member into said beam where an end of said bolt threadingly engages said beam, said bolt having a diameter that is less than the diameter of the bore formed in said support member so that said support member can pivot with respect to the longitudinal axis of said bold, said bolt further including a head formed on said bolt at its end opposite the end that is treaded into said beam, said load cell further including a spring extending between the head of said bolt and said support member to urge said support member toward said beam.

2. A load cell comprising:

a frame;

a beam mounted on said frame at two spaced apart points;

a load carrying member supporting said load;

a pivot point support positioned between said beam and said load carrying member so said pivot point support prevents said load carrying member from applying rotational moments to said beam:

transducer means for measuring load induced strains in said beam indicative of the weight of said load; and fastening means interconnecting said beam and said load carrying member, said fastening means restraining relative movement between said beam and said load carrying member toward and away from each other while allowing relative angular movement between said beam and said load carrying member.

3. The load cell of claim 2 said fastening means comprises a bolt extending through a bore formed in said load carrying member into said beam where an end of said bolt threadingly engages said beam, said bolt having a diameter that is less than the diameter of the bore formed in said load carrying member so that said load carrying member can pivot with respect to the longitudinal axis of said bolt.

4. The load cell of claim 3 wherein a head is formed on said bolt at its end opposite the end that is treaded into said beam, said load cell further including a spring extending between the head of said bolt and said load carrying member to urge said load carrying member toward said beam.

5. The load cell of claim 3 wherein four of said bolts are symmetrically positioned equidistant from said pivot point support.

6. The load cell of claim 2 wherein said beam is a bending beam that bends as a function of the magnitude of said load, and wherein said transducer means measures the magnitude of the bending of said beam.

7. The load cell of claim 2 wherein said beam is a shear beam that undergoes shear strains as a function of the magnitude of said load, and wherein said transducer means measures the magnitude of said shear strains.

8. The load cell of claim 2 wherein said pivot point support is a sphere positioned between said beam and said load carrying member.

9. The load cell of claim 8 wherein said sphere is positioned within respective recesses formed in said beam and said load carrying member to restrict movement of said sphere relative to said beam and said load carrying member.

* * * * *